UNITED STATES PATENT OFFICE.

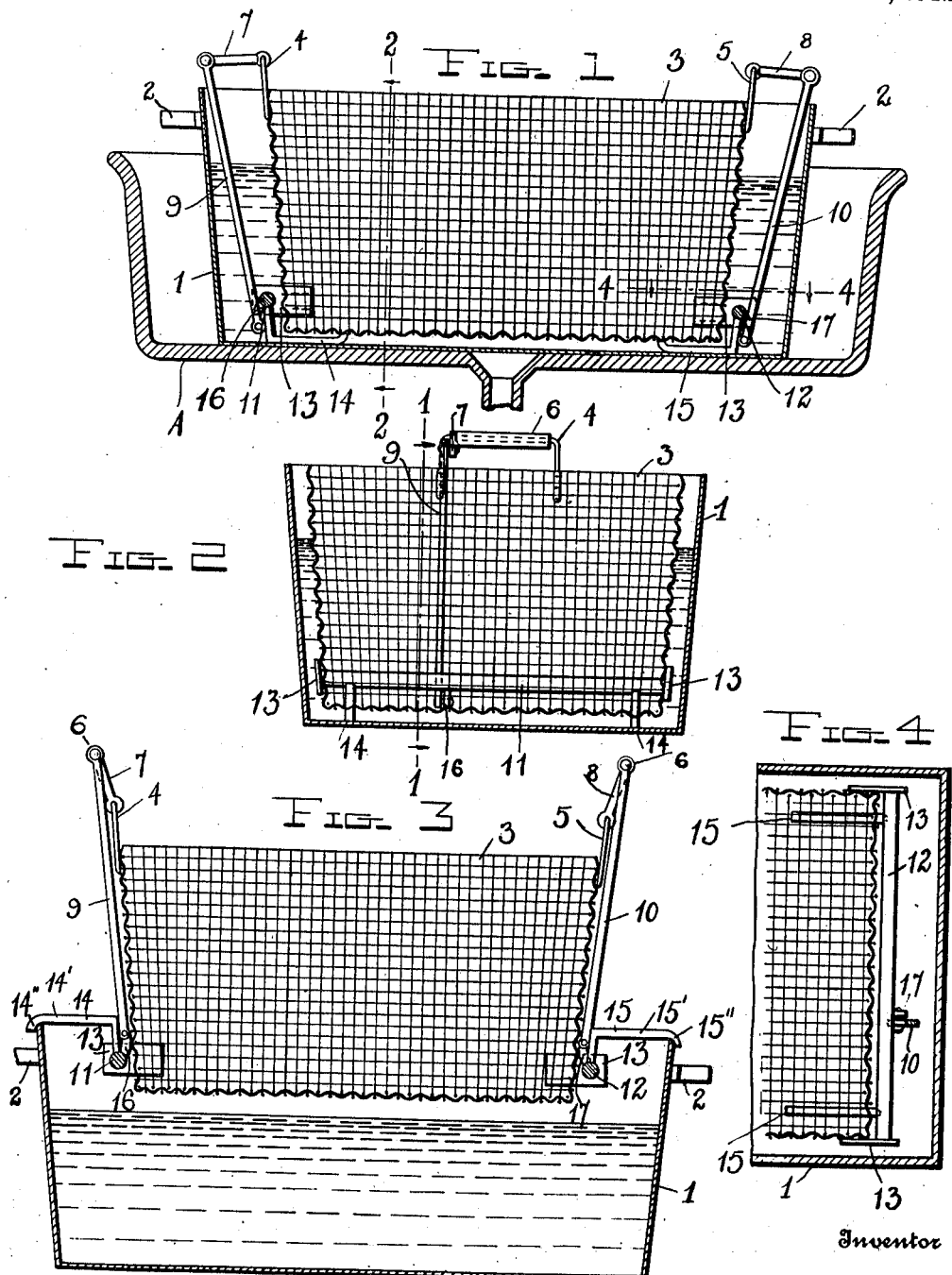

HERBERT S. NESBITT, OF ST. LOUIS, MISSOURI.

DISH-WASHER.

1,048,862.  Specification of Letters Patent.  Patented Dec. 31, 1912.

Application filed October 10, 1912. Serial No. 725,003.

*To all whom it may concern:*

Be it known that I, HERBERT S. NESBITT, a citizen of the United States, residing at St. Louis, in the State of Missouri, have invented certain new and useful Improvements in Dish-Washers; and I do declare the following to be a full, clear, and exact description of the invention, such as will enable others skilled in the art to which it appertains to make and use the same.

This invention relates to improvements in that class of dish washers in which a hand operated dish receptacle is moved through the water.

One object of the invention is to provide a simply constructed and efficient washer of this character by the use of which dishes may be thoroughly cleansed and dried without the hands of the operator coming in contact with either the water or the dishes which renders it especially sanitary as well as a labor saver.

Another object of the invention is to provide simple and efficient means for holding the dish receptacle suspended above the wash water to permit the dishes to drain.

With these and other objects in view, the invention consists of certain novel features of construction, combination and arrangement of parts as will be more fully described and claimed.

In the accompanying drawings; Figure 1 represents a longitudinal section through a sink with this improved washer disposed therein and also shown in longitudinal section, said section being taken on the line 1—1 of Fig. 2; Fig. 2 is a transverse vertical section taken on the line 2—2 of Fig. 1; Fig. 3 is a longitudinal vertical section through the washer showing the dish receptacle in elevated draining position; Fig. 4 is a horizontal section taken on the line 4—4 of Fig. 1.

In the embodiment illustrated a water containing pan 1 is shown preferably of rectangular configuration to adapt it to sit within a sink A. This pan 1 has the usual handles 2 for moving it from place to place.

A dish receptacle 3 is shown in the form of a wire basket of suitable mesh and of less size than the pan 1 to adapt it to be freely reciprocated vertically in said pan with ample space around it to permit the cleansing fluid to flow over and around the dishes in the basket 3 whereby said dishes are thoroughly cleansed without handling.

Bail shaped handles 4 and 5 are fixed to the opposite ends of the basket 3 preferably at its upper end and are shown provided with sleeves 6 revolubly mounted thereon which are adapted to be gripped by the hands of the operator for plunging the basket up and down in the water contained in the pan 1. Links 7 and 8 are pivoted at one end to the handles 4 and 5 and at their other ends to rods 9 and 10 for a purpose to be described. Shafts 11 and 12 are revolubly mounted at opposite ends of the basket 3 in suitable bearings secured near the bottom of said basket and here shown in the form of brackets 13. Longitudinally spaced basket supporting members 14 and 15 are fixed to the shafts 10 and 11 and are here shown L-shaped with their free arms 14' and 15' normally extending under the basket as shown in Fig. 1 to dispose them out of the way and to permit the basket to be moved freely in the pan 1. The terminals of these arms 14' and 15' are preferably bent to form hooks 14'' and 15'' for engaging the edges of the pan 1 as shown in Fig. 3 for reliably supporting the receptacle or basket 3 in elevated position above the wash water in the pan 1 to provide for the draining of the dishes after they have been cleansed. Crank rods 16 and 17 are fixed at one end to the shafts 10 and 11 and at their other ends are pivotally connected with the lower ends of the rods 8 and 9 which are operable to throw the L-shaped members 14 and 15 into and out of operation.

In the operation of this dish washer the dishes are placed in the basket 3 in such a manner as to permit water to reach every part of them and the basket is then lowered into the pan 1 and allowed to remain therein a few minutes to loosen the particles of food remaining on the dishes. The handles 4 and 5 are then gripped by the operator and the basket 3 plunged up and down in the water in the pan 1 it being of course understood that a cleansing ingredient such as soap or soap powder has been first added to the water. After the dishes have been thoroughly cleansed by the plunging of the basket 3 the rods 9 and 10 are raised into the position shown in Fig. 3, whereby the supporting members 14 and 15 are brought into operative position to engage the upper edges of the pan 1 as shown in Fig. 3, the basket being thus suspended above the pan 1 to permit the dishes to drain. If desired, clear hot water may be poured over the dishes while in suspended position to rinse them. After they have drained sufficiently the basket 3 is removed from over the pan 1 to a draining board or other suitable place and the dishes allowed to dry without wiping.

While I have described my invention with more or less minuteness as regards details and as being embodied in certain precise forms, I do not desire to be limited thereto unduly any more than is pointed out in the claims. On the contrary, I contemplate all proper changes in form, construction and arrangement, the omission of immaterial elements and substitution of equivalents as circumstances may suggest or render expedient.

I claim as my invention:

1. A dish washer comprising an outer water containing vessel, a perforated dish holder movable vertically within the outer vessel and having handle members fixed thereto, pivoted supports for said holder adapted to be swung over the upper edges of the outer vessel, and actuating means connecting said supports with said handles.

2. A dish washer comprising an outer water containing vessel, a perforated dish holder movable vertically within the outer vessel, handles fixed to said holder, supporting members pivoted to the lower end of said holder and adapted to be swung over the upper edges of the outer vessel, and crank rods for actuating said supporting members.

3. A dish washer comprising an outer water containing vessel, a perforated dish holder movable within the outer vessel and having handles fixed to its upper end, shafts revolubly mounted on the lower ends of said holder, L-shaped supports fixed to said shafts and adapted to be swung over the upper edges of the outer vessel, cranks fixed to said shafts, and actuating rods connected with said cranks and with said handles.

4. A dish washer comprising an outer water containing vessel, a perforated dish holder movable vertically within the outer vessel and having handle members fixed thereto, pivoted supports for said holder adapted to be swung over the upper edges of the outer vessel, actuating rods pivotally connected with said cranks, and links pivotally connecting said rods with said handles.

In testimony whereof I have hereunto set my hand in presence of two subscribing witnesses.

HERBERT S. NESBITT.

Witnesses:
　NICK D. BOSEPEN,
　JOS. R. CUPPY.